(12) United States Patent
Tan (10) Patent No.: US 9,999,303 B2
(45) Date of Patent: Jun. 19, 2018

(54) COLUMN-BEAM CONNECTING ASSEMBLY CAPABLE OF BEING MANUALLY ASSEMBLED AND FRAME STRUCTURE ASSEMBLED THEREBY

(71) Applicant: Jianmin Tan, Foshan (CN)

(72) Inventor: Jianmin Tan, Foshan (CN)

( * ) Notice: Subject to any disclaimer, the term of this patent is extended or adjusted under 35 U.S.C. 154(b) by 0 days. days.

(21) Appl. No.: 15/516,030

(22) PCT Filed: Jan. 19, 2015

(86) PCT No.: PCT/CN2015/071025
§ 371 (c)(1),
(2) Date: Mar. 31, 2017

(87) PCT Pub. No.: WO2016/054878
PCT Pub. Date: Apr. 14, 2016

(65) Prior Publication Data
US 2017/0303687 A1    Oct. 26, 2017

(30) Foreign Application Priority Data
Oct. 11, 2014 (CN) .......................... 2014 1 0532547

(51) Int. Cl.
*A47B 96/14* (2006.01)
*A47B 96/06* (2006.01)

(52) U.S. Cl.
CPC ............ *A47B 96/14* (2013.01); *A47B 96/068* (2013.01); *A47B 2096/1491* (2013.01)

(58) Field of Classification Search
CPC ....... A47B 47/00; A47B 57/30; A47B 13/003; A47B 2013/022

USPC .... 108/180, 147.15, 147.12, 147.17, 158.11, 108/158.12; 211/187, 190, 192; 248/407, 243, 188
See application file for complete search history.

(56) References Cited

U.S. PATENT DOCUMENTS 3,143,981 A * 8/1964 Tassell ................... A47B 57/54
108/108
3,181,923 A * 5/1965 Guillon ................ A47B 17/006
108/148

(Continued)

FOREIGN PATENT DOCUMENTS

CN    2289891 Y    9/1998
CN    2339800 Y    9/1999

(Continued)

*Primary Examiner* — Jose V Chen
(74) *Attorney, Agent, or Firm* — Gokalp Bayramoglu (57) ABSTRACT

The invention discloses a column-beam connecting assembly capable of being manually assembled, including connecting columns and connecting beams. The connecting column is formed with an arc channel along the axial direction. The arc channel opens to the surface of the column as a groove. A number of pairs of anchor slots are shaped on both sides of the groove, and the anchor slots of the same pair are at the same height. Mounting parts for snapping into the anchor slots are shaped on both sides of the connecting beam. Half T-shaped jointing heads are provided on the outer ends of said mounting pans for connecting to the arc channel, and said jointing heads are either in the shape of a column head matching the arc channel, or in the shape of a hook head. A frame structure assembled by the connecting parts is further disclosed.

8 Claims, 10 Drawing Sheets

(56) References Cited

U.S. PATENT DOCUMENTS

| | | | | |
|---|---|---|---|---|
| 3,259,079 A * | 7/1966 | Freeman | A47B 47/042 | 108/186 |
| 3,525,560 A * | 8/1970 | Mac-Farlane | A47B 47/03 | 312/194 |
| 3,747,885 A * | 7/1973 | Ciancimino | F16B 12/32 | 211/182 |
| 3,779,177 A * | 12/1973 | Gigante | A47B 47/05 | 108/158.12 |
| 3,862,691 A * | 1/1975 | Mori | A47B 57/40 | 108/156 |
| 3,896,743 A | 7/1975 | Pariente | | |
| 3,999,875 A * | 12/1976 | Simon | A47B 57/30 | 211/189 |
| 4,079,678 A * | 3/1978 | Champagne | A47B 57/545 | 108/106 |
| 4,145,098 A * | 3/1979 | Alexander | F16B 12/34 | 312/195 |
| 4,163,537 A * | 8/1979 | Mourgue | A47B 17/003 | 108/156 |
| 4,180,003 A * | 12/1979 | Clement | A47B 57/16 | 108/147.15 |
| 5,647,650 A * | 7/1997 | Daugherty | A47B 57/565 | 108/180 |
| 5,899,423 A * | 5/1999 | Albertini | A47B 13/02 | 108/50.11 |
| 5,915,803 A * | 6/1999 | Daugherty | A47B 46/00 | 312/263 |
| 7,886,673 B2 * | 2/2011 | Korte | A01G 9/143 | 108/110 |
| 7,931,420 B2 * | 4/2011 | Maffeis | E04B 1/585 | 248/298.1 |
| 8,191,488 B2 * | 6/2012 | Sacco | A47B 91/00 | 108/153.1 |
| 8,376,157 B2 * | 2/2013 | Jarvis | A47B 47/045 | 108/147.12 |
| 9,211,006 B2 * | 12/2015 | Chen | A47B 87/0223 | |
| 2008/0092787 A1 * | 4/2008 | McAllister | A47B 57/265 | 108/147.12 |
| 2017/0156486 A1 * | 6/2017 | Blick | A47B 3/06 | |

FOREIGN PATENT DOCUMENTS

| | | |
|---|---|---|
| CN | 2913712 Y | 6/2007 |
| CN | 202135969 U | 2/2012 |
| CN | 204186719 U | 3/2015 |

* cited by examiner

COLUMN-BEAM CONNECTING ASSEMBLY CAPABLE OF BEING MANUALLY ASSEMBLED AND FRAME STRUCTURE ASSEMBLED THEREBY

CROSS REFERENCE TO RELATED APPLICATIONS

This application is the national phase entry of International Application No. PCT/CN2015/071025, filed on Jan. 19, 2015, which is based upon and claims priority to Chinese Patent. Application No. 201410532547.6 filed on Oct. 11, 2014, the entire contents of which are incorporated herein by reference.

TECHNICAL FIELD

The present invention relates to the technical field of furniture and building structures, in particular to a column-beam connecting assembly capable of being manually assembled and a frame structure assembly thereby.

BACKGROUND OF THE INVENTION

Existing furniture is usually provided by furniture manufacturers in mass production, and a customer can only select a piece of furniture, which meets the aesthetic requirements and use requirements, from existing styles. Some manufactures may also customize their production according, to the requirements of customers; however, this process is time-consuming and usually, lasts long, and the furniture cannot be changed or adjusted according the actual requirements in the future.

For the above reasons, at present, assembly furniture which can be assembled by the customers themselves has also appeared, and the customers can adjust the furniture when assembling, so that the structure thereof meets the aesthetic requirements and use requirements to some extent. With regard to this kind of products, the key technical point is providing a simple and stable connecting method so that the customers can assemble the furniture assemblies and obtain the desired furniture in a way allowed by the connecting method.

Similarly, some of the existing simple architectural structures such as an outdoor tent and an outdoor stage, are also formed by some of fixed assemblies. However, with regards to the existing assemblies, professional assisting tools are needed to complete the building operation.

SUMMARY OF THE INVENTION

In view of the above problems, an object of the present invention is to provide a column-beam connecting assembly capable of being manually assembled and a frame structure assembled thereby, which can be connected without a professional assisting tool, is simple to connect and has a stable structure.

In order to achieve the above-mentioned object, the present invention uses the following technical solution: a column-beam connecting assembly capable of being manually assembled comprises connecting columns and connecting beams. Said connecting column is provided with an arc channel along the axial direction and the arc channel opens to the surface of the column as a groove. A number of pairs of anchor slots are shaped on both sides of the groove, and the anchor slots of the same pair are at the same height. Mounting parts for snapping into the anchor slots are shaped on both sides of said connecting beam. Half T-shaped jointing heads are provided on the outer ends of said mounting parts for connecting to the arc channel. Said jointing heads are either in the shape of a column head matching the arc channel, or in the shape of a hook head with a width less than the width of the groove.

In the column-beam connecting assembly capable of being manually assembled provided by the present invention, the jointing column head and the jointing hook head on the connecting beam can be clamped in the arc channel, the anchor slots on the connecting column can be fitted and fixed with the mounting parts on the connecting beam, so that the connecting method is simple, the connection and assembly can be carried out without a professional assisting tool, and a stable structure is achieved after connection. Meanwhile, since the jointing column head or the jointing hook head on the connecting beam is formed on one half of the outer side of the mounting part and is fitted with a pair of anchor slots at the same height, the pair of connecting beams can be located at the same height on the same connecting column.

Furthermore, said groove is provided with a notch for guiding the jointing column head into the arc channel. The column head can be guided into the arc channel via the notch on the groove.

Furthermore, said channel penetrates through at least one end of the connecting column. When the arc channel penetrates through one end of the connecting column, a hole can be formed in the end face for the jointing column head to enter, and in addition, the structure can also save materials and reduce weight.

With regard to the frame structure assembled by the column-beam connecting assemblies, the frame structure is formed by a number of connecting columns and a number of connecting beams connected between the connecting columns in closed connection. Said connecting column includes a right-angle column for use at the corner part of the frame structure, and a flat-angle column for use along the side or at corner part of the frame structure. Said right-angle column and flat-angle column are provided with grooves opening to column surfaces. A number of pairs of anchor slots are shaped on both sides of the groove and the anchor slots of the same pair are at the same height. The maximum included angle between two connecting beams connected to the anchor slots of the same pair on the right-angle column is 90 degrees, and the maximum included angle between two connecting beams connected to the anchor slots of the same pair on a flat-angle column is 180 degrees. Mounting parts for snapping into the anchor slots are shaped on both sides of said connecting beam. Half T-shaped jointing heads are provided on the outer ends of said mounting parts for connecting to the arc channel. Said jointing heads are either in the shape of a column head matching the arc channel, or in the shape of a hook head with a width less than the width of the groove. At least one connecting beam is formed with a jointing hook head on one half of the outer side of the mounting part.

A pair of connecting beams on the right-angle column can be connected to each other at 90 degrees, and therefore can form two connecting beams at a corner of a corner support frame of a frame. A pair of connecting beams on the flat-angle column can be connected to each other at 180 degrees, and therefore can be provided between two right-angle columns and support the connecting beam between the two right tangle columns. The frame structure is formed by the connecting beam and the connecting column in closed connection, and the connecting beam needs to be rotated when the jointing column head is connected and cannot complete the closed connection by means of the jointing column head, therefore at least one joint with a jointing hook head is required to complete the closed connection of the flame structure.

Furthermore, a corner brace for fixing an included angle between two adjacent connecting beams is further comprised, and said connecting beam and the corner brace 3 are fitted and connected via a mortise and tenon structure. The corner brace can fix the included angle between two adjacent connecting beams and prevent the connecting beam 2 from rotating. Using the mortise and tenon structure for fitting and connection can ensure a stable connection between the connecting beam and the corner brace without using any tool.

Furthermore, a cross beam transversely connected between two opposite connecting beams is further comprised, and said cuss beam and the connecting beam are fitted and connected via a mortise and tenon structure. The cross beam can fix two opposite connecting beams. Using the mortise and tenon structure for fitting and connection can ensure a stable connection between the connecting beam and the corner brace without using any tool.

Furthermore, an anti-rotation connecting core for longitudinally connecting two connecting columns is further comprised, and said anti-rotation connecting core is connected to the arc channels of the two connecting columns and snaps into the groove. The anti-rotation connecting core can longitudinally connect the two connecting columns, so that the frame structure can be expanded longitudinally, and the ability of snapping into the groove can prevent the two connecting columns from relative rotation after connection.

1 Connecting column, 11 Channel, 111 Groove, 12 Anchor slot, 13 Notch, 2 Connecting beam, 21 Mounting part, 22 Jointing column head, 23 Jointing hook head, 3 Corner brace, 4 Cross beam, 5 Anti-rotation connecting core.

DETAILED DESCRIPTION OF THE INVENTION

The technology claimed by the present invention is further described in detail in conjunction with the drawings and particular embodiments.

Embodiment I

Figure 1:
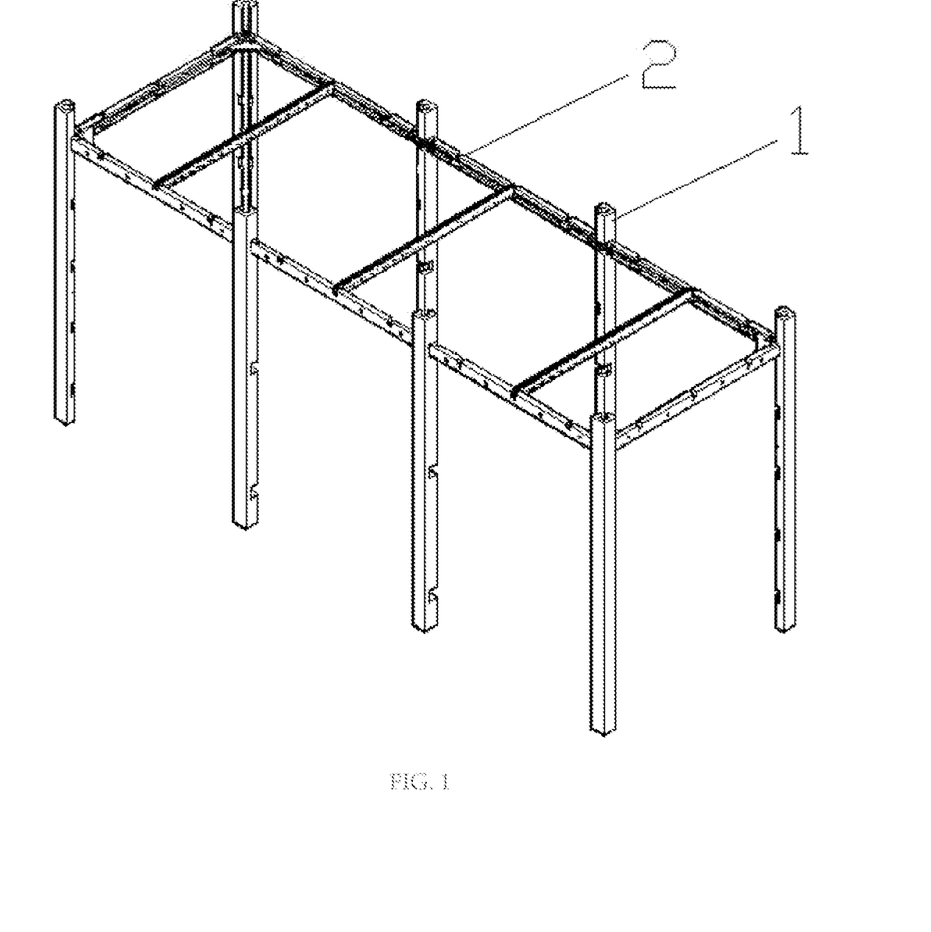
FIG. 1 is a structural schematic view of embodiment I.

FIG. 1 shows a frame structure of the present embodiment. The frame structure is in an overall rectangular shape, wherein a lengthwise edge is formed by combining four connecting columns 1 connected via a connecting beam 2, and a widthwise edge is formed by two connecting columns 1 connected via a connecting beam 2. The connecting column 1 located at the corner part is a right-angle column, and the maximum included angle between the two connecting beams 2 connected to the right-angle column is 90 degrees. The connecting column 1 located between two flat-angle columns is a flat-angle column, and the maximum included angle between the two connecting beams 2 connected to the flat-angle column is 180 degrees.

Figure 2:
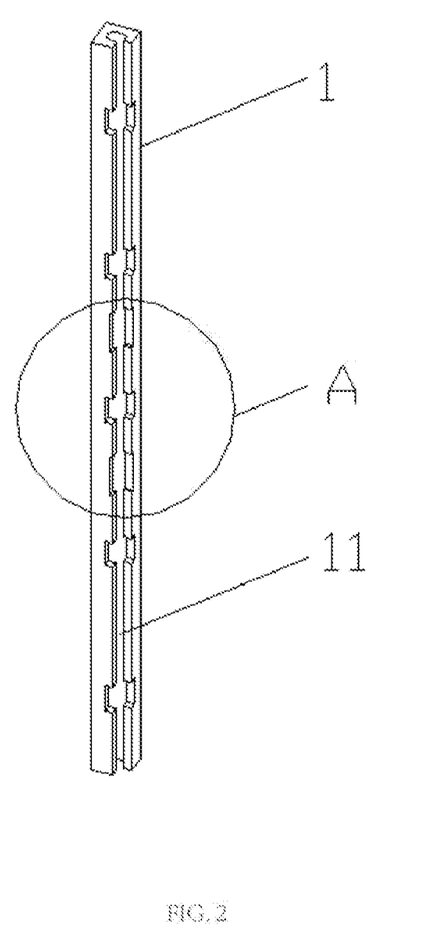
FIG. 2 is a structural schematic view of a right-angle column.
Figure 3:
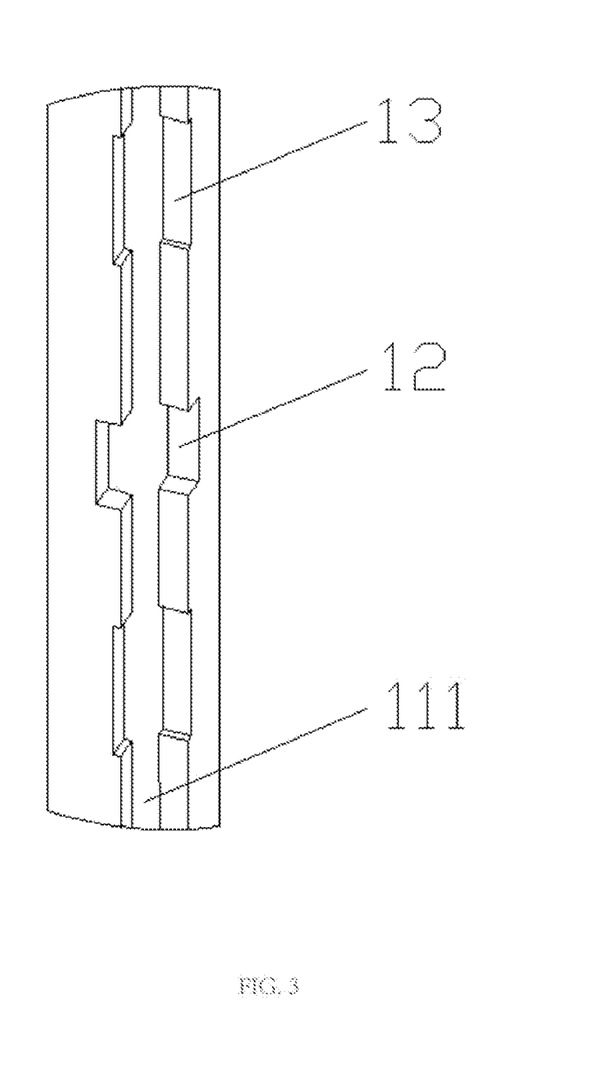
FIG. 3 is a partial structural schematic view of region A in FIG. 2.

As shown in FIGS. 2 and 3, the right-angle column in the present embodiment is, approximately an overall square column. The right-angle column is provided with a circular channel 11 with the radian being about 300 degrees, and the arc channel 11 penetrates through two ends of the right-angle column and thus forms holes on two end faces. A groove 111 is formed at the corner edge of the side of the connecting column 1. Five pairs of anchor slots 12 are shaped on both sides of the groove 111, and the anchor slots 12 of the same pair are at the same height. The inner walls of the anchor slots 12 of the same pair are at 90 degrees, such that the maximum included angle between two connecting beams 2 connected in the anchor slots of the same pair on the right-angle column is 90 degrees. The middle of the connecting column 1 is further provided with two notches 13 in the arc channel 11, and the area of the notch 13 is so large that the jointing column head 22 on the connecting beam 2 can extend into the notch.

Figure 4:
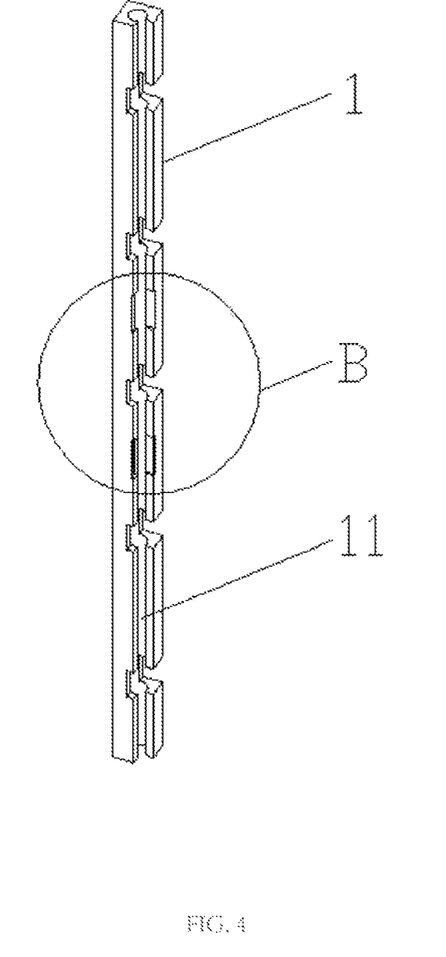
FIG. 4 is a structural schematic view of a flat-angle column.
Figure 5:
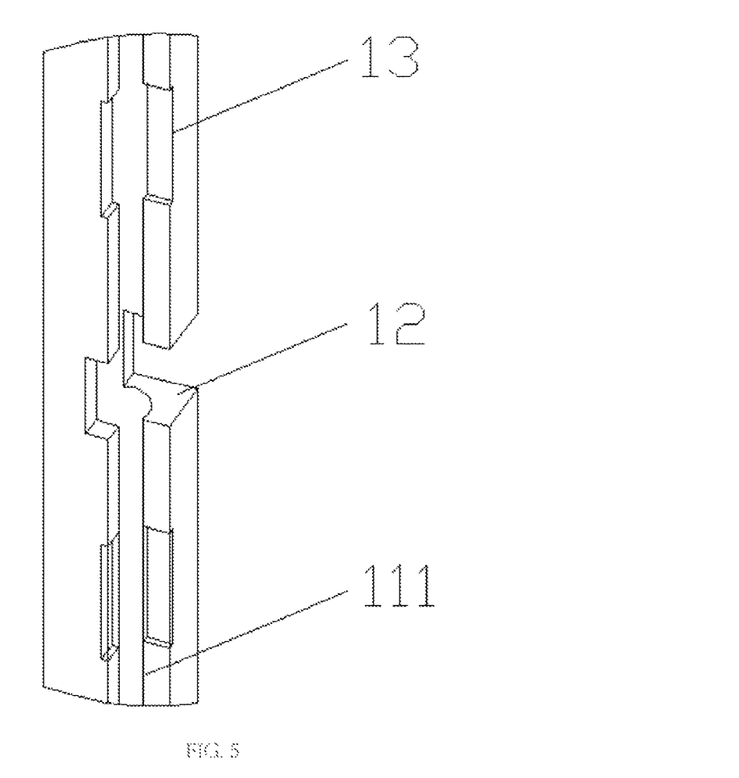
FIG. 5 is a partial structural schematic view of region B in FIG. 4.

As shown in FIGS. 4 and 5, the flat-angle column and the right-angle column have a similar structure, and the difference in structure lies in that the inner walls of the anchor slots 12 of the same pair on the flat-angle column are at 180 degrees, such that the maximum included angle between two connecting beams 2 in the anchor slots of the same pair on the flat-angle column is 180 degrees.

Figure 6:
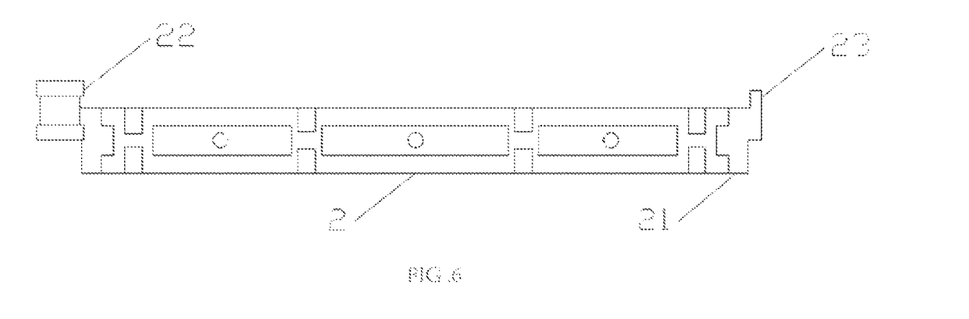
FIG. 6 is a main view of a connecting beam.

FIG. 6 shows a connecting beam 2 in the present embodiment. Mounting parts 21 are shaped on both ends of the connecting beam 2. The shape of the mounting part 21 matches the anchor slot 12. A circular jointing column head 22 is formed on one half of the outer side of the mounting part 21 at one end of the connecting beam, and the mounting part 21 and the jointing column head 22 form a half T-shaped structure. The size of the jointing column head 22 matches that of the arc channel 11. A jointing hook head 23 is formed at the outer end of the mounting part 21 at the other end of the connecting beam, and the mounting part 21 and the jointing hook head 23 form a half T-shaped structure. The width of the jointing hook head 23 is less than the width of the groove 111. Alternative to the connecting beam 2 exemplified in the present embodiment, a jointing column head 22 or a jointing hook head 23 can be formed on the mounting parts 21 at two ends of the connecting beam 2, and the jointing column head 22 or the jointing hook head 23 on the mounting parts 21 at two ends can also be respectively formed at two different halves of the outer side of the mounting parts 21.

Figure 7:
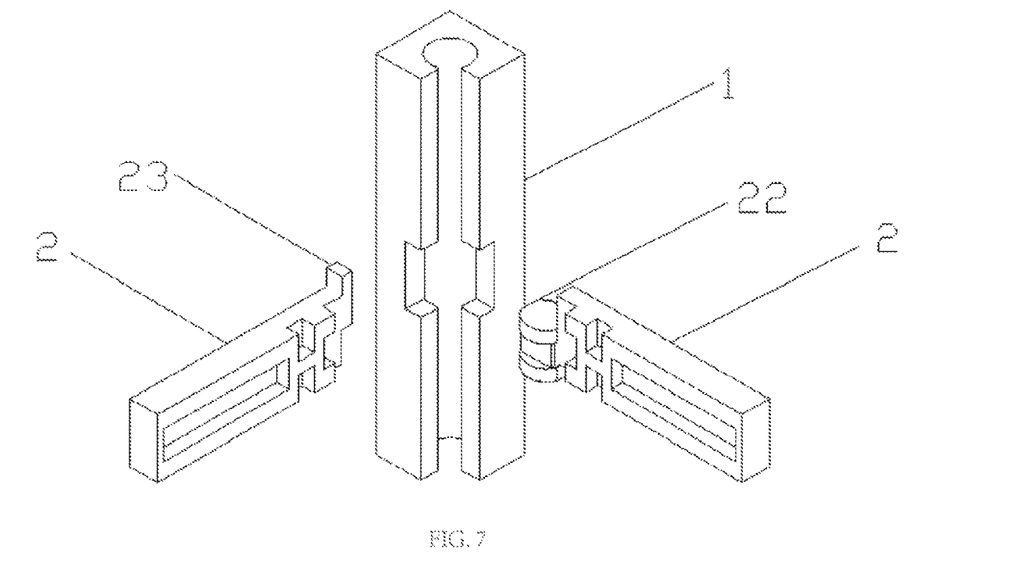
FIG. 7 is a schematic view of a connecting structure between a connecting column and a connecting beam.

As shown in FIG. 7, for connection, the jointing column head 22 on the connecting beam 2 is firstly inserted into the arc channel 11 from the hole at the top of the connecting column 1. Since the shape of the jointing column head 22 matches that of the arc channel 11, the jointing column head 22 can slide in the arc channel 11 to the corresponding position of the anchor slot 12. Then with the jointing column head 22 as the axis of rotation, the connecting beam 2 is rotated such that the mounting part 21 on the connecting beam 2 is just snapped into the anchor slot 12, which is the effect generated by the cooperation of the mounting part 21 and the anchor slot 12 in shape. After the mounting part 21 is snapped into the anchor slot 12, the connecting beam 2 cannot slide up and down along the an channel 11 via the jointing column head 22. At the same time, since the jointing column head 22 is clamped in the arc channel 11 by the inner walls of the arc channel 11 and cannot be directly removed from the anchor slot 12, the jointing column head 22 has the function of further fixing the connection between the connecting beam 2 and the connecting column 1.

After one of the anchor slots 12 is connected to the jointing column head 22, the jointing hook head 23 is used to connect the other anchor slot. Since the width of the jointing hook head 23 is less than the width of the groove 111, the jointing hook head 23 can be directly pushed into the arc channel 11 from the groove 111 of the arc channel 11 and the mounting part 21 is snapped into the other anchor slot 12. The jointing column head 22 and the jointing hook head 23 are respectively formed at two different halves of the outer side of the respective mounting part 21, specifically in the present embodiment, the jointing column head 22 is formed at the lower half of the outer side of the mounting part 21, and the jointing hook head 23 is formed at the upper half of the outer side of the mounting part 21. Therefore, for connection, the two heads can only occupy the respective space in the arc channel 11 and may not cause incompatibility with each other, and the cooperation thereof can also ensure a more stable connection between the two connecting beams 2 and the connecting column 1. In the other embodiment, two connecting beams 2 provided with jointing column heads 22 are connected to a pair of anchor slots 12 at the same height, Since the jointing hook head 23 can directly enter and exit the groove 111, the stability of the structure after connection is inferior to the jointing column head 22. The jointing hook head 23 is used only in the situation where the jointing column head 22 is not available, such as when two fixed connecting columns 1 which cannot rotate are connected.

In the present embodiment, since a notch 13 is Rimed in the middle of the connecting column 1, the jointing column head 22 on the connecting beam 2 can firstly extend into the notch 13 and then push the jointing column head 22 into the arc channel 11, without needing of guiding the jointing column head 22 into the arc channel 11 via holes at two ends of the connecting column 1, which simplifies the operation in connection and installation. Moreover, when it is necessary to replace a connecting beam 2 later, there is also no need to dismount other connecting beams 2 located between the hole and the connecting beam 2 to be replaced, which facilitates the adjustment of columns and beams of the furniture by a user.

Figure 8:
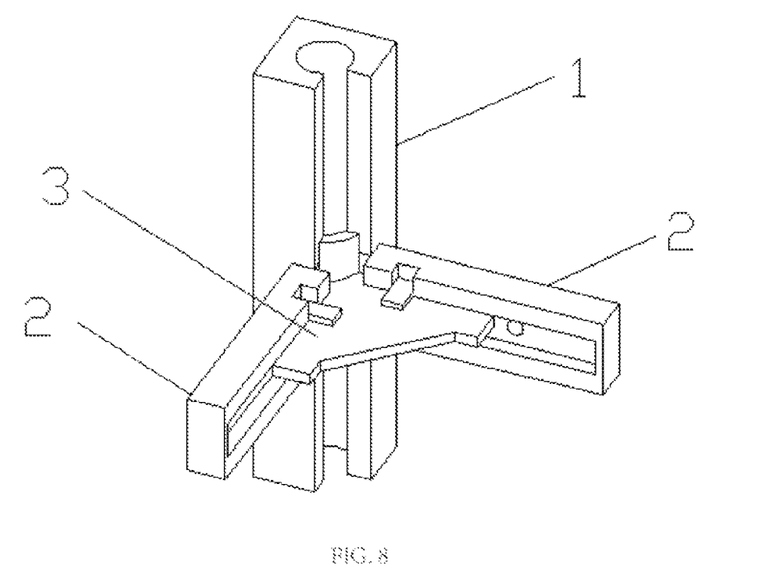
FIG. 8 is a structural schematic view after the connection of a corner brace.
Figure 9:
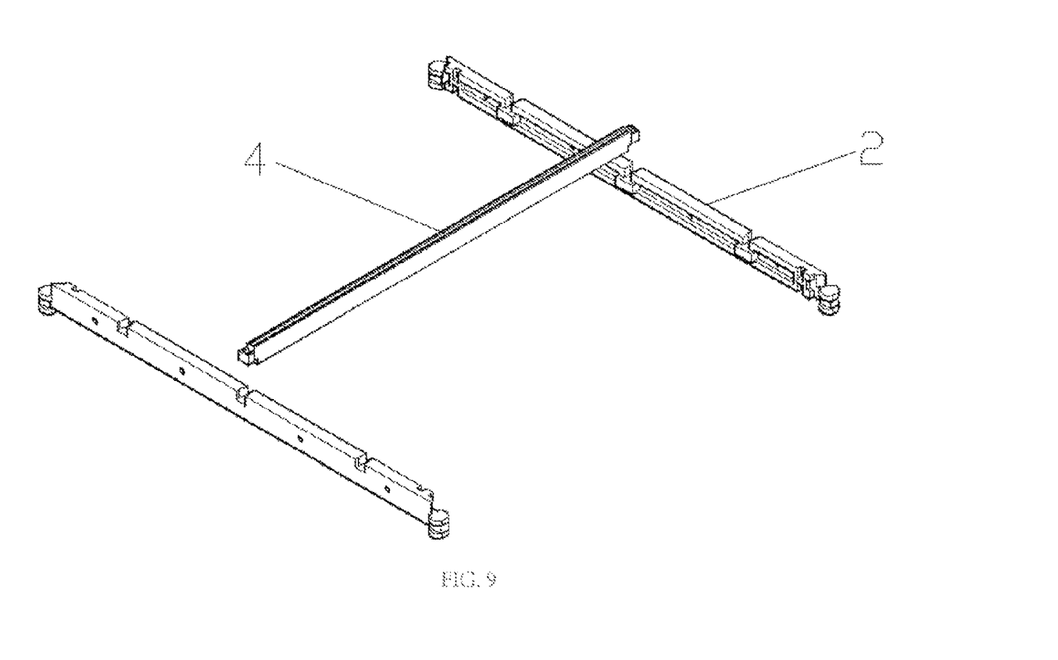
FIG. 9 is a schematic view of a connecting structure between a cross beam and a connecting beam.

As shown in FIG. 8, with regard to two connecting beams 2 connected in the anchor slots 12 of the same pair at the same height, a corner brace 3 can be used to ensure a more stable connection therebetween. Tenons are shaped on both sides of the corner brace 3 of the present embodiment, and recesses fitted to the tenons are formed in the corresponding positions of the connecting beam 2. The tenon on the corner brace 3 is inserted into the recess of the connecting beam 2 to achieve the connection between the corner brace 3 and the connecting beam 2. The corner brace 3 can effectively fix the included angle between two connecting beams 2 to prevent the connecting beams from rotating. As shown in FIG. 9, a cross beam 4 is transversely connected between two opposite connecting beams 2. Tenons are shaped on both ends of the cross beam 4 and can be fitted and connected to the recesses on the connecting beam 2.

Embodiment II

Figure 10:
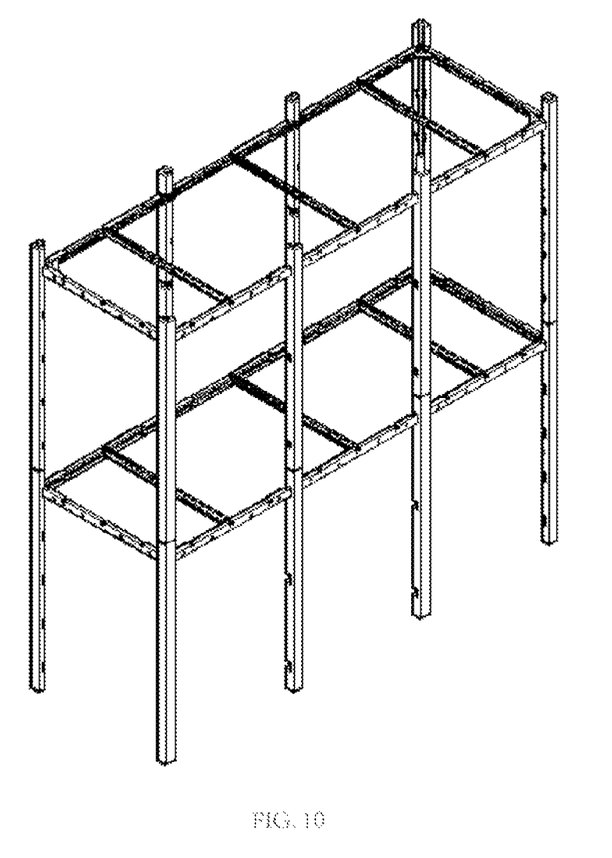
FIG. 10 is a structural schematic view of embodiment II.

As shown in FIG. 10, the frame structure of the present embodiment is formed by longitudinally connecting two frame structures of embodiment I. More specifically, it is formed by longitudinally connecting the connecting columns 1 on the two frame structures of embodiment I.

Figure 11:
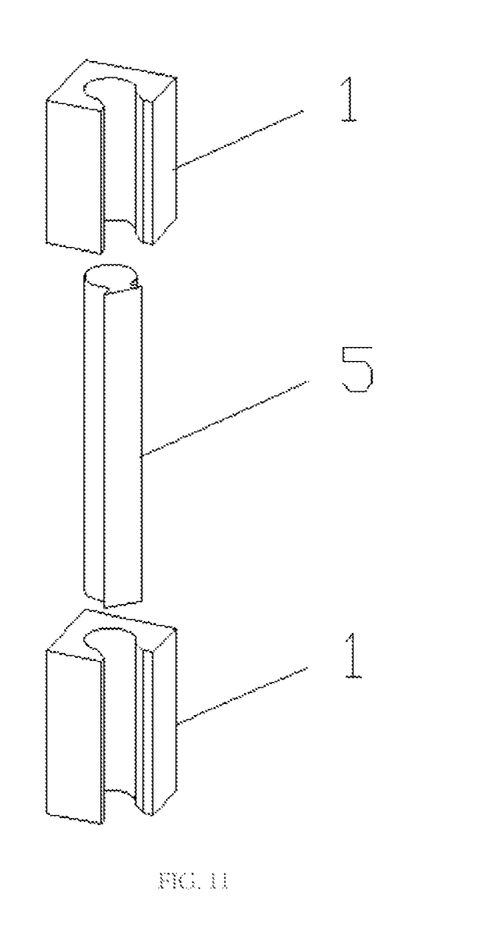
FIG. 11 is a schematic view of a connecting structure between a connecting column and an anti-rotation connecting core.

Two connecting columns 1 can be connected via an anti-rotation connecting, core 5. As shown in FIG. 11, the shape of the anti-rotation connecting core 5 matches those of the arc channel 11 and the groove 111 of the connecting column, and the anti-rotation connecting core can be connected to the arc channels 11 of upper and lower connecting columns 1 and snap with the groove 111, so as to longitudinally connect two connecting columns 1 and prevent relative rotation between the upper and lower connecting columns 1. For connection, the anti-rotation connecting core 5 is firstly inserted into the arc channel 11 from the hole of the lower connecting column 1, and then the hole of the upper connecting column 1 is aligned with the anti-rotation connecting core 5 projecting from the half of the lower connecting column 1, such that the anti-rotation connecting core is inserted into the arc channel 11 of the upper connecting column 1. With the above operation, the anti-rotation connecting core 5 can be inserted into the arc channels 11 of the two connecting columns 1 and is snapped into the groove 111 so as to complete the longitudinal connection between the two connecting columns 1.

With the fitting and connection between the connecting columns 1 and the anti-rotation connecting core 5, the frame structure can be expanded in the perpendicular direction.

Embodiment III

Figure 12:
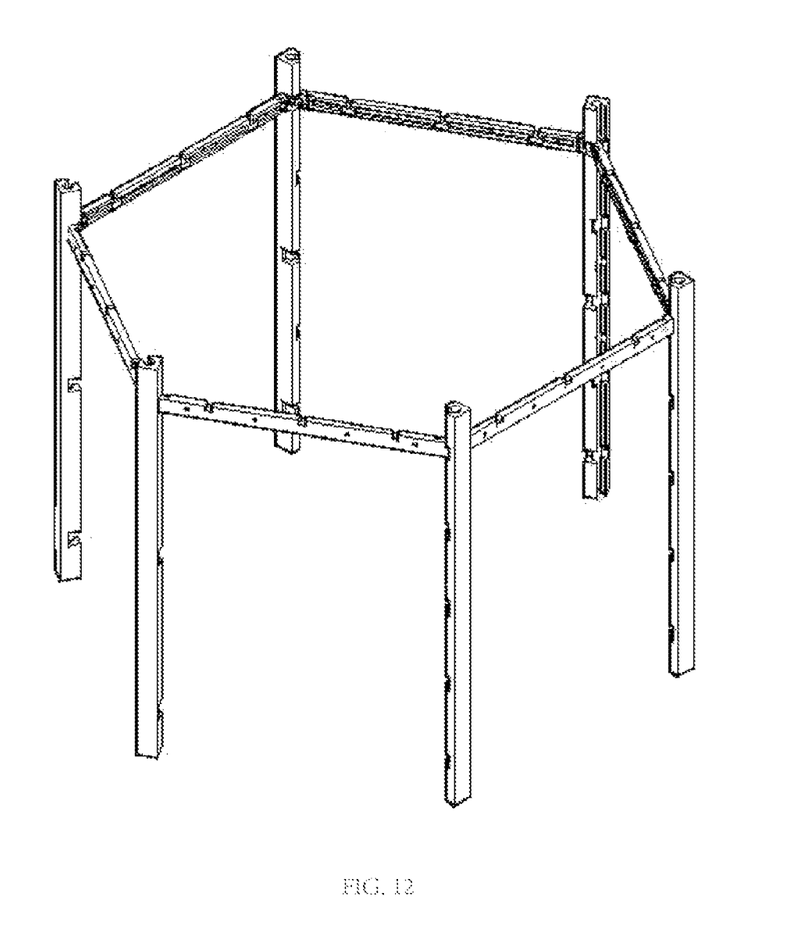
FIG. 12 is a structural schematic view of embodiment III.

As shown in FIG. 12, the frame structure of present embodiment is a hexagon framework which is formed by six flat-angle columns in embodiment I connected by six connecting beams 2 in closed connection.

The maximum included angle between two connecting beams 2 connected in the anchor slots of the same pair on the flat-angle column is 180 degrees, which means that the included angle between two connecting beams 2 can be adjusted within 180 degrees. In the present embodiment, the flat-angle columns form the corner parts of the frame structure, and the angle of each corner is 120 degrees. The flat-angle column can also be used to provide the frame structure with more angles, such that the frame structure extends in the horizontal directions at various angles.

Compared to the right-angle column, the connecting beam 2 on the flat-angle column can achieve a greater range of included angle, and theoretically also covers the range of an included angle of the right-angle columns. However, since the anchor slot 12 of the flat-angle column is relatively large, the anchor slot 12 may have a relatively large gap in the case that the included angle between the two connecting beams 2 is not 180 degrees, and the appearance is relatively unpleasant. Therefore, unless the frame structure has a corner part with an angle unequal to 90 degrees, the flat-angle column is generally used at the edge of the frame structure.

Since A number of pairs of anchor slots 12 at different heights are formed on the connecting beam 2, a user can choose the anchor slots 12 at different heights to be connected to the connecting beam 2, thereby achieving the adjustment of the height of the connecting beam 2. Meanwhile, the flat-angle column and the anti-rotation connecting core 5 can be used to enable the frame structure to be expanded in the horizontal directions at various angles and in the perpendicular direction. The user can customize the assembling and connection of the column-beam assembly provided by the present invention according to personal requirements so as to achieve a frame structure which meets the requirements.

The above-mentioned embodiments are only preferred embodiments of the present invention, and are not intended to limit the range of the implementation of the present invention, and therefore, changes made according to the shape and principle of the present invention shall be contained within the scope of protection of the present invention.

The invention claimed is:

1. A column-beam connecting assembly capable of being manually assembled, comprising at least one connecting column and at least one connecting beam, wherein said connecting column is provided with an arc channel along an axial direction; the arc channel opens to a surface of said connecting column as a groove; a plurality of pairs of anchor slots are shaped on both sides of the groove, and the plurality of pairs of anchor slots are at a same height; a plurality of mounting parts for snapping into the plurality of pairs of anchor slots are shaped on both sides of said connecting beam; a plurality of half T-shaped jointing heads are provided on each outer end of said plurality of mounting parts for connecting to the arc channel; the plurality of half T-shaped jointing heads slide in the arc channel to a corresponding position of the plurality of pairs of anchor slot, then with the plurality of half T-shaped jointing heads as the axis of rotation, said connecting beam is rotated such that the plurality of mounting parts mounting parts on the connecting beam are snapped into the plurality of pairs of anchor slot respectively, and the plurality of half T-shaped jointing heads are either in a shape of a column head matching the arc channel, or in a shape of a hook head with a width less than a width of the groove.

2. The column-beam connecting assembly capable of being manually assembled according to claim 1, wherein said groove is provided with a notch for guiding said jointing head in the shape of the column head into the arc channel.

3. The column-beam connecting assembly capable of being manually assembled according to claim 2, wherein said arc channel penetrates through at least one end of the connecting column, such that a hole be formed in an end face of the end of the connecting column for the half T-shaped jointing column head to enter.

4. The column-beam connecting assembly capable of being manually assembled according to claim 1, wherein the arc channel penetrates through at least one end of the connecting column, such that a hole be formed in an end face of the end of the connecting column for the half T-shaped jointing column head to enter.

5. A frame structure assembled by column-beam parts, the frame structure being formed by a plurality of connecting columns and a plurality of connecting beams connected between the plurality of connecting columns in a closed connection, wherein each connecting column includes a right-angle column for using at a first corner part of the frame structure, and a flat-angle column for using along a side or at a second corner part of the frame structure, said right-angle column and said flat-angle column are provided with at least one groove opening to column surfaces; a plurality of pairs of anchor slots are shaped on both sides of the groove, and the plurality of pairs of anchor slots are at a same height; a first maximum included angle between two connecting beams connected to each pair of anchor slots on the right-angle column is 90 degrees; a second maximum included angle between two connecting beams connected to each pair of anchor slots on a flat-angle column is 180 degrees; a plurality of mounting part for snapping into the plurality of pairs of anchor slots are shaped on both sides of each connecting beam; a plurality of half T-shaped jointing heads are provided on each outer end of said plurality of mounting parts for connecting to the arc channel; said plurality of half T-shaped jointing heads are either in a shape of a column head matching the arc channel, or in a shape of a hook head with a width less than a width of the groove; and at least one connecting beam is formed with a jointing head in the shape of the hook head on one half of an outer side of each mounting part.

6. The frame structure assembled by column-beam parts according to claim 5, wherein the frame structure further comprises a corner brace for fixing an included angle between two adjacent connecting beams, each of the two adjacent connecting beams and the corner brace being fitted and connected via a mortise and tenon structure.

7. The frame structure assembled by column-beam parts according to claim 5, wherein the frame structure further comprises a cross beam transversely connected between two opposite connecting beams, and said cross beam and each of the two opposite connecting beams are fitted and connected via a mortise and tenon structure.

8. The frame structure assembled by column-beam parts according to claim 5, wherein the frame structure further comprises an anti-rotation connecting core for longitudinally connecting two connecting columns, and said anti-rotation connecting core is connected to each arc channel of the two connecting columns and said anti-rotation connecting core is snapped into the groove.

* * * * *